United States Patent
Henzler

(10) Patent No.: US 11,504,777 B2
(45) Date of Patent: Nov. 22, 2022

(54) TOOL SYSTEM

(71) Applicant: CeramTec GmbH, Plochingen (DE)

(72) Inventor: Uwe Henzler, Hochdorf (DE)

(73) Assignee: CERAMTEC GMBH, Plochingen (DE)

( * ) Notice: Subject to any disclaimer, the term of this patent is extended or adjusted under 35 U.S.C. 154(b) by 211 days.

(21) Appl. No.: 16/496,327

(22) PCT Filed: Mar. 16, 2018

(86) PCT No.: PCT/EP2018/056709
§ 371 (c)(1),
(2) Date: Sep. 20, 2019

(87) PCT Pub. No.: WO2018/172218
PCT Pub. Date: Sep. 27, 2018

(65) Prior Publication Data
US 2020/0030888 A1   Jan. 30, 2020

(30) Foreign Application Priority Data

Mar. 22, 2017   (DE) .................... 10 2017 204 825.5
Mar. 24, 2017   (DE) .................... 10 2017 205 029.2
(Continued)

(51) Int. Cl.
*B23B 27/16*   (2006.01)

(52) U.S. Cl.
CPC .... *B23B 27/1625* (2013.01); *B23B 2200/088* (2013.01); *B23B 2226/18* (2013.01)

(58) Field of Classification Search
CPC .......... B23B 2200/088; B23B 27/1625; B23B 27/164; B23B 27/1637; B23B 27/1629;
(Continued)

(56) References Cited

U.S. PATENT DOCUMENTS 5,820,311 A * 10/1998 Grun .................... B23B 27/1677
407/102
6,394,709 B1 * 5/2002 Sjoo ....................... B23B 27/164
407/2
(Continued)

FOREIGN PATENT DOCUMENTS

CN   1535193 A   10/2004
CN   101391311 A   3/2009
(Continued)

OTHER PUBLICATIONS

International Search Report for PCT/EP2018/056709, dated Jul. 4, 2018, and English Translation submitted herewith (7 pgs.).
(Continued)

*Primary Examiner* — Ryan Rufo
(74) *Attorney, Agent, or Firm* — Fitch, Even, Tabin & Flannery

(57) ABSTRACT

Tool system (1) comprising a tool holder (2) that includes an insert seat (17) for accommodating an insert (6) having a depression (7), further comprising a clamping element (4) that has an opening (26) for accommodating a clamping means (15), and a projection (5), and comprising a mechanism (functional dimension (Fx) that limits the linear mobility of the clamping element (4). This ensures that a disposable insert (6) can be repeatedly securely clamped.

11 Claims, 6 Drawing Sheets

(30) Foreign Application Priority Data

Figure 1:
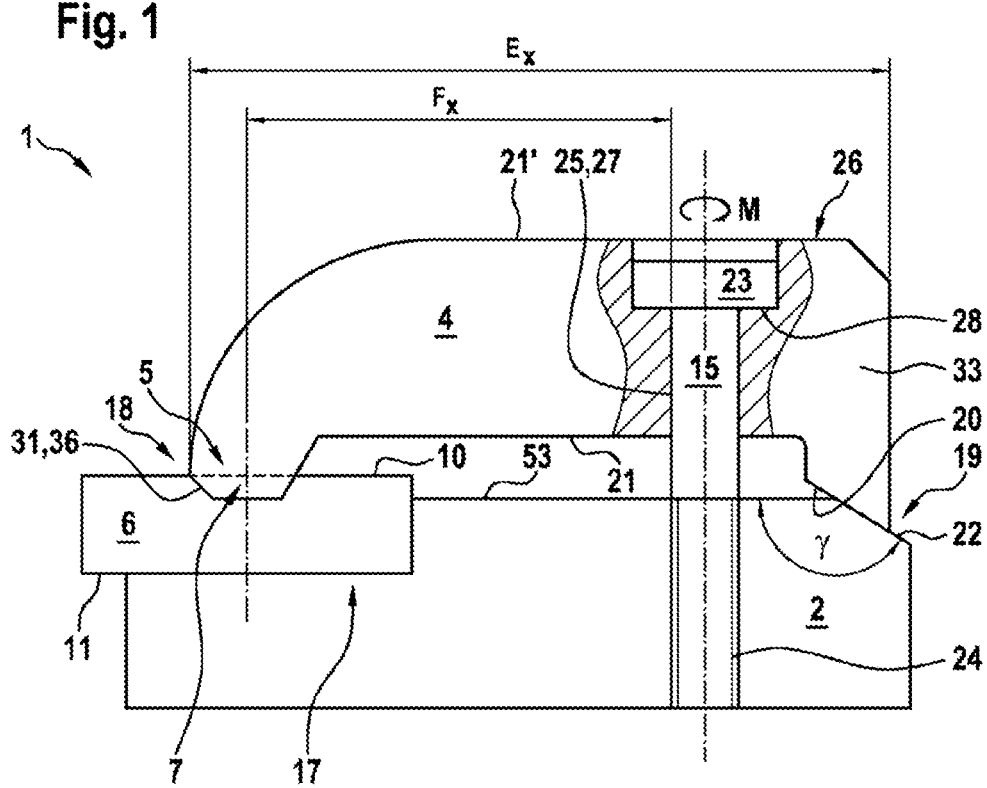

Aug. 30, 2017 (DE) ...................... 10 2017 215 156.0
Sep. 11, 2017 (DE) ...................... 10 2017 215 972.3

(58) Field of Classification Search

CPC ............ B23B 27/1644; B23B 27/1651; B23B 2260/03; B23C 5/2239; B23C 5/2243; B23C 2270/08; Y10T 407/2282; Y10T 407/2284

See application file for complete search history.

(56) References Cited

U.S. PATENT DOCUMENTS

| | | | | |
|---|---|---|---|---|
| 9,016,985 | B2 * | 4/2015 | Amor | ............... B23B 27/164 407/107 |
| 2003/0086766 | A1 | 5/2003 | Andras | |
| 2004/0256608 | A1 * | 12/2004 | Eder | ................. B23B 27/1625 254/401 |
| 2005/0186039 | A1 * | 8/2005 | Muller | ................. B23B 27/164 407/113 |
| 2005/0253319 | A1 | 11/2005 | Zitzlaff | |
| 2013/0129438 | A1 * | 5/2013 | Ben Amor | ........... B23B 27/145 407/109 |
| 2014/0294520 | A1 * | 10/2014 | Henzler | ................. B23B 27/16 407/11 |

FOREIGN PATENT DOCUMENTS

| | | | | |
|---|---|---|---|---|
| CN | 102348522 A | | 2/2012 | |
| DE | 2936869 A1 | * | 3/1981 | ......... B23B 27/1644 |
| DE | 19854873 A1 | | 5/2000 | |
| DE | 10 2010 029616 A1 | | 12/2010 | |
| DE | 102016200195 A1 | * | 7/2016 | ......... B23B 27/1614 |
| EP | 1 595 648 A2 | | 11/2005 | |
| GB | 1567004 A | * | 5/1980 | ......... B23B 27/1651 |
| JP | 2009-101513 A | | 5/2009 | |
| JP | 2014-534082 A | | 12/2014 | |
| KR | 100533312 B1 | | 8/2004 | |
| KR | 10-2014-0094573 A | | 7/2014 | |
| WO | 2003/013770 A1 | | 2/2003 | |
| WO | 2007/080151 A1 | | 7/2007 | |
| WO | WO-2008062825 A1 | * | 5/2008 | ......... B23B 27/1625 |
| WO | 2013/060752 A1 | | 5/2013 | |
| WO | 2016/110596 A1 | | 7/2016 | |

OTHER PUBLICATIONS

Office action dated Apr. 29, 2022 in counterpart Korean Appl. 10-2019-7028730.
Office action dated Mar. 7, 2022 in counterpart JP Appln. No. 2019-551992.
Office action dated Jul. 5, 2022 in counterpart Brazil Appln. No. 112019016760-9.

* cited by examiner

TOOL SYSTEM

CROSS-REFERENCE TO RELATED APPLICATIONS

This application is a U.S. national phase application filed under 35 U.S.C. § 371 of International Application No. PCT/EP2018/056709, filed Mar. 16, 2018, designating the United States, which claims priority from German Patent Application No. 10 2017 204 825.5, filed Mar. 22, 2017, German Patent Application No. 10 2017 205 029.2, filed Mar. 24, 2017, German Patent Application No. 10 2017 215 156.0, filed Aug. 30, 2017, and German Patent Application No. 10 2017 215 972.3, filed Sep. 11, 2017, which are hereby incorporated herein by reference in their entirety for all purposes.

The invention relates to a tool system comprising a cutting insert and comprising a tool holder which has an insert seat for receiving the cutting insert having a depression and, remote from said insert seat, a surface of the tool holder adjacent to the insert seat has a face inclined at an obtuse angle, comprising a clamping element which has an opening having a stop, in which opening a clamping screw having a guiding portion is received, a face and a lug, the projection of the clamping element having an annular surface and the depression of the cutting insert having an annular surface, the annular surface of the clamping element and the annular surface of the cutting insert abutting each other in an interlocking manner when the cutting insert is clamped and, during the process of fastening the clamping element on the tool holder, i.e. when generating a torque, when turning the clamping screw, the face of the clamping element sliding on the face of the tool holder, as a result of which the clamping element moves relative to the tool holder and pulls and clamps the cutting insert into the insert seat.

When clamping a cutting insert in a tool holder, several requirements need to be met. It is thus necessary for the machining of workpieces that the cutting insert is held precisely and immovably in a tool holder. In this case, the receiving space, the insert seat of the cutting insert, should be designed such that, in the case of wear, the cutting insert can be positioned without much additional effort exactly at the same point as the cutting insert to be replaced. The repeatability of the cutting insert position is an indispensable requirement for an insert seat of a tool holder. Furthermore, it is necessary that the actual process of clamping the cutting insert, i.e. clamping the cutting insert firmly in the tool holder, is designed as simply as possible, because situations in which the accessibility of a cutting insert is impeded are possible in production. This may be the case when a plurality of tool holders are arranged on a tool carrier and a cutting insert has to be replaced at one of the tool holders. It may be necessary to replace a cutting insert "overhead".

Various options for arranging and fastening a cutting insert are disclosed in the prior art. Thus, for example, it is known to clamp a cutting insert which has a depression into which a mating part of a clamping jaw engages. The mating part can be arranged integrally with the clamping jaw or on a pressure insert, which in turn interacts with the clamping jaw.

It is also known to clamp a cutting insert without a depression, over the planar surface thereof. The clamping jaw or a corresponding pressure piece then also has a planar clamping surface.

Combinations of the above-described clamping methods are also disclosed. Fastening a cutting insert by means of a depression and at the same time over the surface of the cutting insert is thus described in the prior art.

In WO 2003/013770 a cutting insert is disclosed which has a clamping depression in the form of a "donut". A circular ring of a pressure piece engages in the clamping depression. The pressure piece has, on its side opposite the cutting insert, shaped means, which interact with corresponding shaped means of the clamping jaw. When tightening a clamping screw, clamping of the cutting insert in the carrier tool is ensured by a slope on the clamping jaw and on the carrier tool in combination with the shaped means of the pressure piece and of the clamping jaw and the circular ring of the pressure piece. This creates a point or linear contact between the circular ring of the pressure piece and the clamping depression in the cutting insert. The forces acting on this point or linear contact on the cutting insert can be so enormous that said insert breaks. This may be the case in particular for very brittle ceramic materials.

WO 2007080151 A1 discloses a machining tool system which consists substantially of a carrier tool which has a recess for receiving a cutting insert. The cutting insert is provided with a clamping depression. The cutting insert is held by a clamping element in the carrier tool. The clamping element is in turn secured on the carrier tool by a clamping screw. An engagement element is arranged on the underside of the clamping element facing the cutting insert, which element is in clamping contact with the clamping depression and thereby anchors the cutting insert on the carrier tool. The clamping element is guided over a slope on the carrier tool such that when tightening the clamping screw, the clamping element is pulled toward the carrier tool.

WO 2013/060752 discloses a tool system suitable for high cutting data and feed rates, the clamping element being movably held in a groove by means of parallel clamping element guides and a clamping element bore for the clamping screw being arranged in the clamping element and, when the cutting insert is clamped, the wall of the clamping element bore facing the cutting insert abutting the clamping screw and the engagement element of the clamping element, as seen from the cutting edge of the cutting insert, engaging in the clamping depression before the middle of said depression in an interlocking manner.

The generic document WO 2016/110596 A1 describes a tool system having all the features of the preamble of claim 1.

DE 10 2010 029616 A1 describes an interlocking and frictional cutting-insert clamping system comprising an anti-twist device.

EP 1 595 648 A2 describes a two-part clamping element.

The object of the invention is that of improving a tool system according to the preamble of claim 1 so that it is possible to securely and repeatably clamp a cutting insert in a precisely positioned manner and so that damage to the cutting insert is prevented.

According to the invention, this object is solved by the features of claim 1.

The invention relates to a tool system comprising a tool holder comprising a clamping element having a clamping element projection and comprising a cutting insert having a depression on the cutting insert surface, for machining workpieces. The depression has a depression bottom, which transitions via an annular surface into the top side of the cutting insert. In a specific embodiment, an elevation can be arranged in the depression, the tip of which ends at a distance from the cutting tip surface. A projection or an attachment of a clamping element or of a pressure insert arranged on the clamping element engages, in the clamped state, in the depression of the cutting insert and thereby clamps said insert on the carrier tool or on the holding element.

The clamping mechanism according to the invention is characterized by a clamping means arranged outside the middle of the clamping element. A sliding surface arranged at an end of the clamping element at an angle is in operative connection with an angled face of the tool holder during the clamping operation. As a result, the clamping element moves relative to the tool holder immovably arranged in the tool system and repeatably clamps the cutting insert such that it is positioned precisely in the insert seat of the tool holder. The horizontal relative movement of the clamping element is limited by a guiding portion of the clamping means coming into abutment against a stop, a wall of the clamping element. According to the invention, the distance between the stop and the middle of the depression of the cutting insert or of the projection of the clamping element is set such that, at the maximum allowable torque, there is a completely planar interlocking connection between the projection of the clamping element and the depression of the cutting insert. In order to ensure this, both the projection of the clamping element and the depression have an annular surface. In the clamped state of the tool system, the two annular surfaces are in operative connection.

The clamping means is arranged outside the middle of the clamping element. The clamping element is arranged offset from the middle at a distance of 30% of half of the clamping element length. The clamping means is particularly preferably arranged offset toward the sliding surface.

Owing to the arrangement according to the invention of the annular surfaces, sliding surfaces and clamping means, a planar contact region of the annular surfaces is produced. Said contact region extends completely over the entire annular surfaces such that force is applied into the cutting insert in a range of 360 degrees.

LIST OF REFERENCE SIGNS

| | |
|---|---|
| 1 | Tool system |
| 2 | Tool holder |
| 4 | Clamping element |
| 5 | Attachment, lug, projection of 4 |
| 6 | Cutting insert |
| 7 | Depression of 6 |
| 10 | Top side of 6 |
| 11 | Underside of 6 |
| 15 | Clamping means, screw |
| 16 | Pressure insert |
| 17 | Insert seat |
| 18 | First end of 4 |
| 19 | Second end of 4 |
| 20 | Face |
| 21, 21' | Flat side of 4 |
| 22 | Face of 2 |
| 23 | Fastening portion of 15 |
| 24 | Clamping portion of 15 |
| 25 | Guiding portion of 15 |
| 26 | Opening, bore |
| 27 | Stop, wall of 26 |
| 28 | Abutment surface of 4 |
| 30, 30' | Bottom of 7 |
| 31 | Annular surface of 7 |
| 32 | Opening of 7 |
| 33, 34 | Narrow flat side of 4 |
| 36 | Annular surface of 5 |
| 38 | Securing means |
| 39 | Recess |
| 40 | Main part of 4 |
| 41 | Receiving space |

-continued

| | |
|---|---|
| 42 | Stop surface |
| 43, 43' | Guiding surface, inside |
| 44, 44' | Groove |
| 45 | Aperture |
| 46 | Spring |
| 47 | Fastening means |
| 48, 48' | Lug, finger |
| 49 | End region of 48 |
| 51 | Opening in 40 |
| 52 | End region of 48 |
| 53 | Surface of 2 |
| Q1 | Cross-sectional area of 30 |
| Q2 | Cross-sectional area of 32 |
| T | Depth of 7 |
| H | Height of 35 |
| m1 | Diameter of 30, 30' |
| m2 | Diameter of 32 |
| m3 | Diameter of 35 |
| m4 | Diameter of 35 |
| A1 | Distance of 45 |

Figure 2:
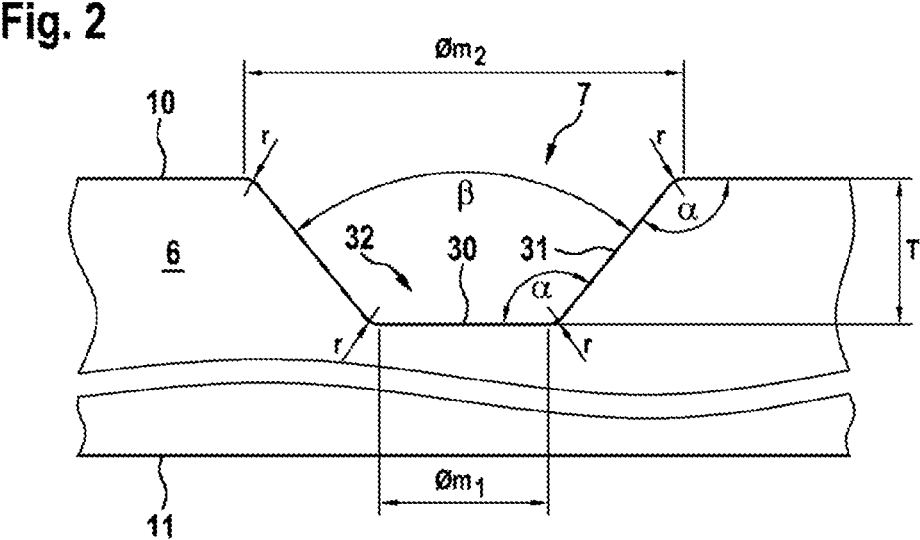
Figure 3:
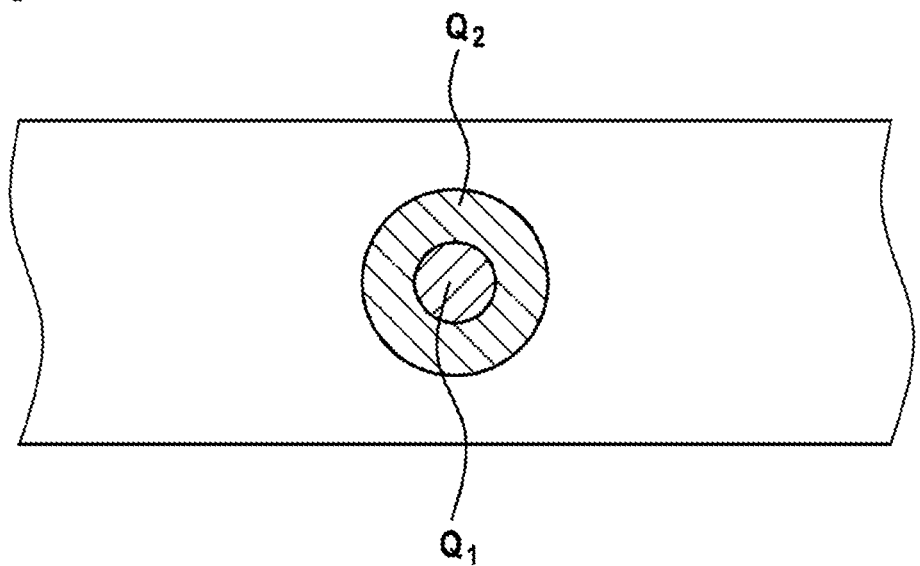
Figure 4:
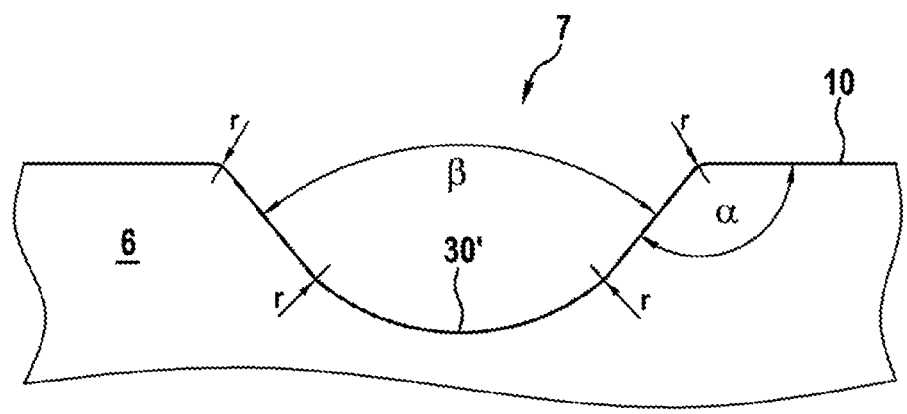
Figure 5:
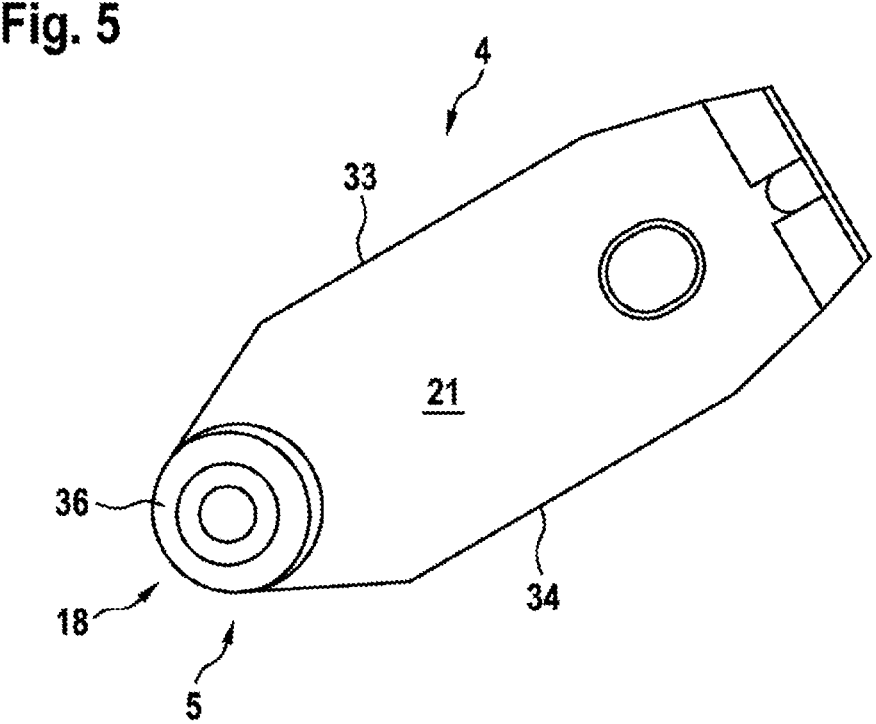
Figure 6:
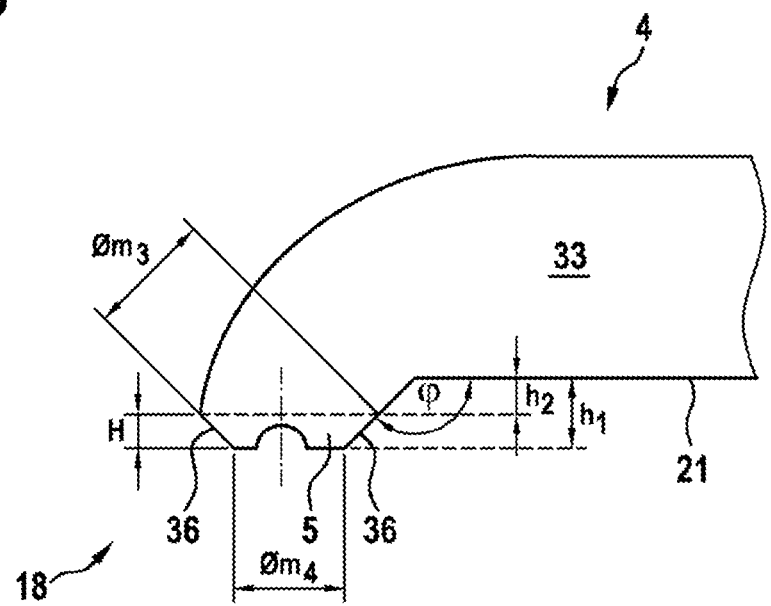
Figure 7:
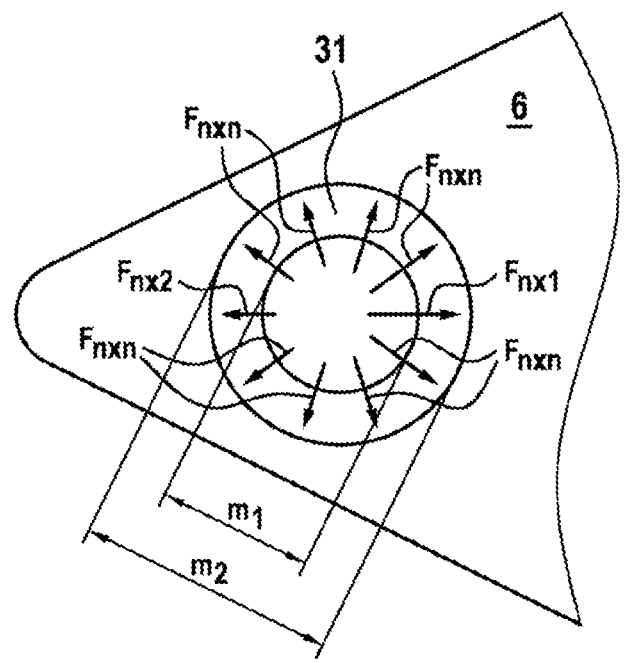
Figure 8:
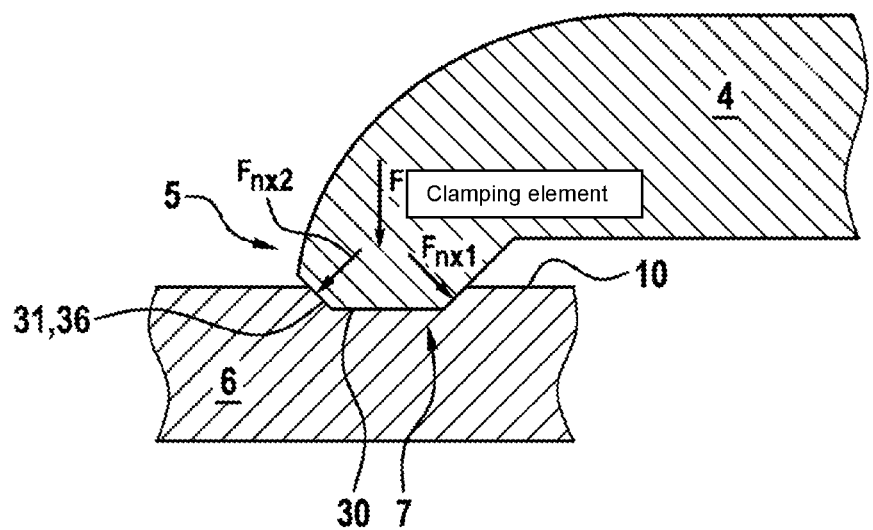
Figure 9:
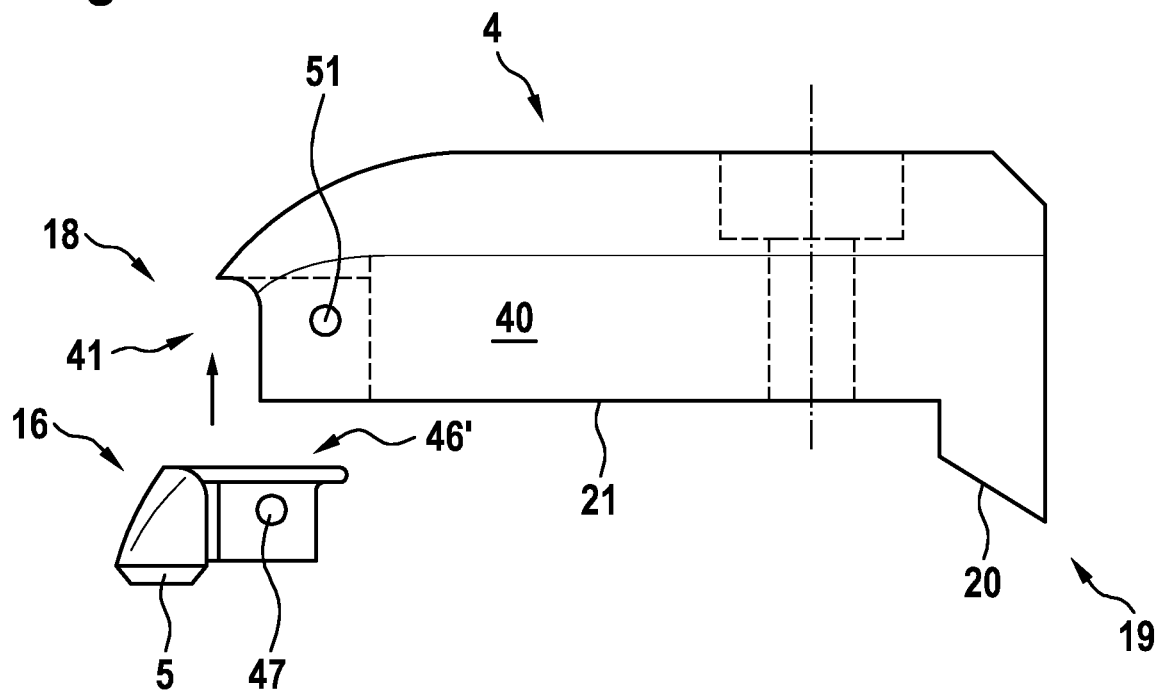
Figure 10:
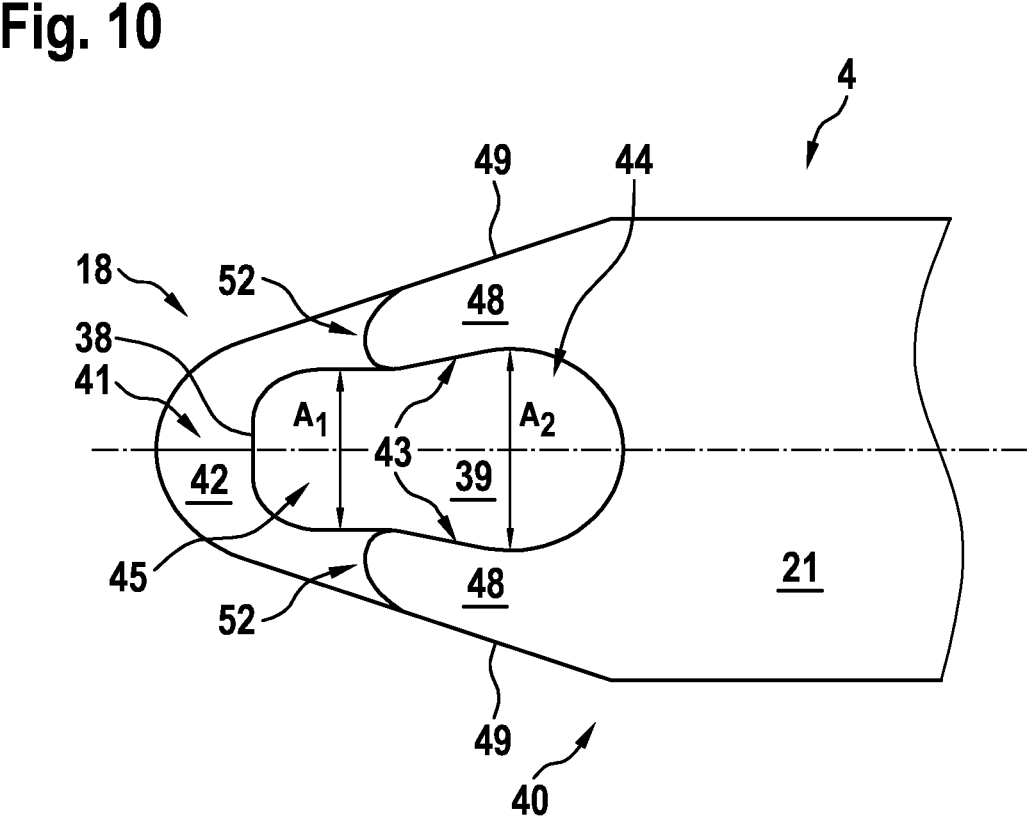

The invention is explained in the following with reference to the drawings, in which:

FIG. 1: is a partial schematic view of a cross section of the tool system, comprising a tool holder, a cutting insert, a clamping element and a clamping means;

FIG. 2: is a partial schematic view of the cross section of a depression of a cutting insert according to FIG. 1;

FIG. 3: is a schematic plan view of FIG. 2;

FIG. 4: is a partial schematic view of the cross section of an alternatively shaped depression of a cutting insert;

FIG. 5: is a schematic view of the clamping element viewed from below;

FIG. 6: is a partial schematic view of the first end of the clamping element comprising a lug;

FIG. 7: is a partial schematic plan view of the depression according to the invention of the cutting insert;

FIG. 8: is a partial schematic view of the mating of the depression together with the lug;

FIG. 9: is a partial schematic view of an alternative embodiment of a clamping element comprising a pressure insert;

FIG. 10: shows the clamping element according to FIG. 9 viewed from below; and

Figure 11:
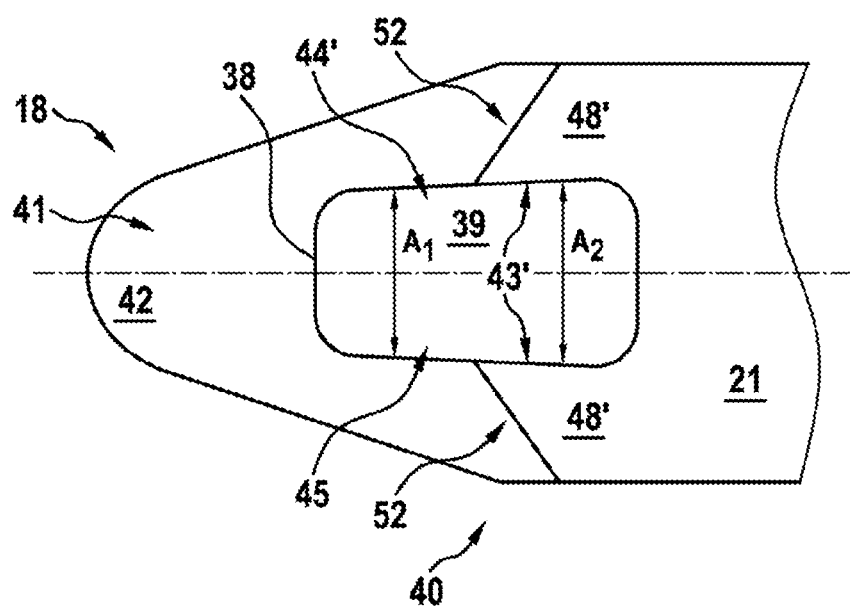

FIG. 11: shows an alternative embodiment of the clamping element according to FIG. 9.

All the figures contain partial schematic views of the invention and are used by way of example to explain the invention. Specific embodiments of the invention may differ from these drawings.

FIG. 1 is a schematic view of a tool system 1 comprising a tool holder 2, a cutting insert 6, which has a depression 7, and a clamping element 4 having a projection 5 which engages in the depression 7 of the cutting insert 6 in the clamped state of the tool system 1. The clamping element 4, which corresponds substantially to the shape of a cuboid and comprises two wide flat sides 21, 21' and two narrow flat sides 33, 34, is fastened to the tool holder 2 using a clamping means 15. The cutting insert 6, which has a depression 7 on the top side 10 thereof, can be and preferably is also in the form of what is referred to as an indexable insert. On an indexable insert 6, a depression 7 is formed on the top side 10 and on the underside 11. The two depressions are identical such that it is possible to position the cutting insert 6, rotated 180 degrees, in the insert seat 17 of the tool holder 2. The projection 5 is arranged on the first end 18 of the cuboid clamping element 4. The shape and mode of operation of the projection 5 are described in the following. On the second end 19 of the clamping element 4, said element has an angled face 20. This face 20 preferably forms, together with the surface 53 of the top side of the tool holder, an obtuse angle ɣ in the range of from 120 to 170 degrees, particularly preferably from 145 to 165 degrees. The top side 10 of the cutting insert 6 is preferably oriented in parallel with the surface 53.

In the region of the face 20 of the clamping element 4, the tool holder 2 has a face 22 that is congruent with the face 20. The two faces 20 and 22 form a sloping plane. The tool holder 2 is immovably held in the tool machine (not shown). When fastening the clamping element 4 to the tool holder 2, i.e. when generating a torque, when turning (closing) the clamping means 15, the face 20 of the clamping element 4 slides on the face 22 of the tool holder 2 (in FIG. 1 to the right and downward). As a result of this clamping mechanism, the clamping element 4 moves relative to the tool holder 2 and pulls and clamps the cutting insert 6 into the insert seat 17 by means of the connection between the lug 5 and the depression 7. The quality of the surfaces of faces 20 and 22 is designed to facilitate sliding of said faces on one another.

In the embodiment according to FIG. 1, the clamping means 15 is designed as a screw, also referred to as a clamping screw. The screw 15 has a fastening portion 23 in the form of a head, and a substantially cylindrical clamping portion 24 and guiding portion 25. The clamping portion 24 can be in the form of a thread, for example an external thread, which interacts with a mating part in the tool holder 2, for example an internal thread. The guiding portion 25 of the screw 15 can be used as a stop for limiting linear movability, in FIG. 1 horizontal movability, of the clamping element 4. Said movability is limited by the interaction of the guiding portion 25 of the screw 15 with the stop, the wall 27 of the opening 26 in the clamping element 4 through which the screw 15 engages in order to fasten the clamping element 4 to the tool holder 2. This limitation prevents damage being caused to the cutting insert 6 when clamping using a torque M that is too high. In addition, this limitation prevents the annular surface 36 of the projection 5 of the clamping element 4 from sliding out of the depression 7 of the cutting insert 6 during clamping. The opening 26 can be designed as a circular bore, for example. Other shapes of said opening 26, for example slit-shaped shaped or oval openings, are also possible. All shapes of the opening 26 have a stop means 28 and a wall 27. The stop means 28 can be in the form of an abutment surface and interacts with the fastening means 23 of the screw 15. The wall 27 of the opening 26 interacts with the guiding portion 25 of the clamping means 15. The clearance provided between the external thread of the clamping portion 24 and the internal thread of the tool holder 2 can be used to compensate for manufacturing tolerances. This clearance preferably allows movement in the range of from 0.1 to 0.2 mm in all directions.

FIG. 1 is a cross section through the clamping mechanism. According to this embodiment, the force is applied by the clamping means 15 outside the middle of the clamping element 4 and thus outside the middle of the clamping mechanism. The middle of the clamping element 4 is half of the distance $E_x$ between the first end 18 and the second end 19 of the clamping element 4. The clamping means is preferably arranged at a distance<$E_x/2$ from the second end 19. According to the invention, the force is applied between the second end 19 and the middle of the clamping element 4 at a distance in the region of from 20 to 40% of $E_x/2$, preferably 30% of $E_x/2$. Due to the tolerances of the individual parts, in combination with the properties (sensitivity to tensile and compressive stress) of the cutting insert 6, the clamping mechanism has to satisfy stringent requirements in order to achieve secure, repeatable fastening of cutting insert 6 in the tool seat 17 without damage being caused to the cutting insert 6.

The distance between the wall 27 of the opening 26 and the middle, the center of the projection 5 or depression 7, is referred to as the functional dimension Fx. According to the invention, this measurement is selected such that, at the maximum allowable torque M, the projection 5 or the annular surface 36 thereof forms, together with the depression 7 or the annular surface 31 thereof, a completely planar interlocking connection and said surfaces abut each another. In this case, the abutment region extends over 360 degrees of the two annular surfaces 31 and 36. There is no distance between the annular surfaces 31 and 36 in the clamped state of the tool system.

One part of the clamping mechanism is the depression 7 of the cutting insert 6, which is shown in FIG. 2. The depression 7 of the cutting insert 6 is arranged in the middle of the top side 10 or underside 11 of the cutting insert 6. In the following, a depression 7 is described which is arranged on the top side 10 of the cutting insert 6. This description also applies, mutatis mutandis, to a depression 7 which is arranged on the underside of an indexable insert 6. The depression 7 is made in the cutting insert 6 as an indentation and has the depth T. The depression 5 can have a planar bottom 30. The bottom 30 can be parallel to the top side 10 of the cutting insert 6 and transitions via an annular surface 31 arranged at an angle α into the surface 10. The angle α between the annular surface 31 and the bottom 30 is an obtuse angle α in the range of from 135 to 155 degrees; said angle α preferably has a range of from 140 to 150 degrees. This gives an opening angle β of the depression 7 in the range of from 90 to 130 degrees, preferably in the range of from 100 to 120 degrees. The cross-sectional area Q1 of the bottom 30 of the depression 7 is smaller than the cross-sectional area Q2 of the opening 32 of the depression 7 (FIG. 3). The depression has a diameter m1 at the bottom 30 and a diameter m2 at the opening 32. The diameter m1 is smaller than the diameter m2. The transitions between the bottom 30 and the annular surface 31 and between the top side 10 and the annular surface 31 may be rounded. The radii of said transitions are in a range between 0.2 mm and 2.5 mm. Said radii are preferably 0.6 mm, particularly preferably 2.0 mm. The depression 7 thus consists of the bottom 30 of the annular surface 31, the opening 32 and the rounded transitions.

In a particular embodiment, the bottom 30 of the depression 7 can be bent in the form of a radius 30' or a polygenetic curve path of a spline (FIG. 4). Viewed from the top side 10 of the cutting insert 6, the bottom 30 formed by the radius 30' can have a concave shape. A particularly advantageously shaped depression 7 according to the invention comprises exclusively rounded transitions r and thus does not have any sharp-edged corners. A rounded depression 7 allows high force application without the risk arising that cracks and consequently fractures may occur in the cutting insert 6. Particular demands are placed on the transitions between different surface shapes. These are places at which cracks can inevitably occur. As a result, said transitions r are preferably rounded according to the invention.

In a specific embodiment (not shown), an elevation can be arranged centrally in the depression. The elevation extends from the bottom 30, 30' of the depression toward the top side 10 and ends below said top side.

FIG. 5 shows the clamping element 4 from the underside of the wide flat side 21 thereof. The flat side of the clamping element 4 is identified by the underside 21, which flat side faces the cutting insert 6 and the tool holder 2 in the clamped state of the tool system 1. A projection 5 in the form of a lug is arranged on the first end 18 of the clamping element 4. Starting from the flat side 21, the lug 5 rises away from the flat side 21. The lug has a height h1 (FIG. 6). At a distance h2 from the flat side 21, the lug 5 transitions into an angled annular surface 36. The height at which the annular surface 36 has is constant over the entire periphery thereof is denoted by H. Starting from a diameter m3, the annular surface 36 extends as far as a diameter m4, the end of the lug 5. In this case, m3 is greater than m4. The distance between m3 and m4 is the height H of the lug 5. The annular surface 36 is arranged at an obtuse angle φ with respect to the flat side 34. Said angle φ is preferably equal to the angle α between the annular surface 31 and the surface 10 of the cutting insert 6.

The height H of the lug 5 correlates with the depth T of the depression 7. Said height and depth can have the same values, but may also be different from each other. For example, H can be greater than T. The diameter m3 of the lug 5 correlates with the diameter m2 of the depression 7. The diameters m3 and m2 can have the same values, but may also be different from each other. For example, m3 can be greater than m2.

In a tool system according to the invention, the magnitude of the angles α and φ is equal, in the range of from 135 to 155 degrees; said angles are preferably in a range of from 140 to 150 degrees. As a result, a more precise interlock is produced over the entire annular surface (360 degrees) between the projection 5 of the clamping element 4 and the depression 7 of the cutting insert 6. The following configurations are possible according to the invention for when angles α and φ are equal:

$m3>m2$, then one has $H>T$, or $H=T$, or $H<T$ $m3=m2$, then one has $H=T$, or $H<T$ $m3>m1$, then one has $H<T$, or $H=T$, or $H>T$ In a tool system comprising a cutting insert 6 having a depression 7 as described above and a clamping element 4 having a lug 5 as described above in combination with the clamping mechanism as described above, the force is applied over the entire annular surface 31 of the depression 7 (FIGS. 7 and 8). The force acts on the annular surface 31 all the way round. A completely planar interlocking connection is produced between the annular surface 36 of the projection 5 and the annular surface 31 of the depression 7. The annular surfaces 31 and 36 can also be planar. In this case, the force $F_{clamping\ element}$ of the clamping element 4 is introduced by means of force vectors $F_{nx}$. Said force vectors are evenly arranged around the annular surface 31. Due to the relative movement of the clamping element 4 with respect to the tool holder 2, caused during clamping by the face 20 of the clamping element 4 sliding on the face 22 of the tool holder 2 and the force $F_{return}$ generated as a result, the magnitude of the force vectors $F_{nx1}$ is greater than the magnitude of the force vectors $F_{nx2}$. In this case, the force vector $F_{nx1}$ which acts in parallel with the return movement of the clamping element has the greatest magnitude. Starting from the magnitude of said force vector $F_{nx1}$, the magnitudes of the force vectors which act on the annular surface 31 decrease continuously as far as the force vector $F_{nx2}$. n additional force vectors act on the ring surface 31 between said two force vectors.

The size, the diameter, the depth, the angle α of the depression and the force $F_{clamping\ element}$ can be selected independently of the size of the cutting insert and of the process parameters, for example material to be machined, feed speed, etc.

FIG. 9 shows an alternative embodiment of the clamping element 4. Insofar as said clamping element is identical to the clamping element described above, the same reference signs apply. Whereas the above-described clamping element 4 is formed in one piece, the clamping element 4 according to FIG. 9 consists of at least two parts. The latter comprises a main part 40, a pressure insert 16 and a fastening means 47. A pressure insert 16 is movably arranged on the first end 18 of the clamping element 4 according to FIG. 9. Said pressure insert 16 may be made of a wear-resistant material, for example hard metal or ceramics. As a result, the first end 18 of the clamping element 4 can be more wear-resistant than the main part 40 thereof. Damages which may occur due to chips at the clamping element 4 occurring in the process are reduced by this increase in wear-resistance, preferably completely prevented. In order to receive the pressure insert 16 in the clamping element 4, the clamping element 4 has a receiving space 41 having a stop surface 42, a recess 39 and a guiding surface 43 (FIG. 10). The stop surface 42 can be planar and parallel to the flat side 21. A recess 39 can also be integrated in the stop surface 42. The region in which the guiding surface 43 is arranged can be in the form of a groove 44 and can comprise constrictions. The distance A1 of the aperture 45 of the groove 44 is preferably smaller than the distance A2 inside the groove 44. The distance A2 is further away from the first end 18 than the distance A1. Owing to the design of the groove 44, the main part 40 has lugs in the form of fingers 48. The outsides 49 of the fingers 48 can be identical to the outsides of the main part 40. However, they may also be partially or completely different in the shape thereof and may be bent toward the central axis of the main part. In FIG. 10, the end region 52 of the fingers is bent toward the central axis and differ in this region from the outer shape of the main part 40 of the clamping element 4. The insides 43 of the fingers correspond to the guiding surfaces of the groove 44 and form, together with a region of the stop surface 42 and the recess 39, the receiving space of the groove 44. What is referred to as an undercut is produced due to the inwardly arranged fingers 48. A pressure insert 16, which has a spring 46 which correlates with the groove 44 and engages in the groove 44, cannot escape toward the first end 18 due to the undercut, the constriction, in the region of the aperture 45. An additional securing means 38 forms the step between the recess 39 and the stop surface 42. Due to said recess 39, the height of the groove, measured from the flat side 21 of the main part 40 of the clamping element 4 to the bottom of the recess 39 is greater than the distance measured from the flat side 21 of the main part 40 of the clamping element 4 to the stop surface 42. If a region of the spring 46 extends into the recess 39 then the transition from the recess 39 to the stop surface 42 forms the securing means 38, which additionally restricts the horizontal freedom of movement of the main insert 16. Owing to the design of the groove 44 of the clamping element 4 and the spring 46 of the pressure insert 16, the pressure insert 16 is captively held in the horizontal movement direction of the clamping element 4. According to the invention, the coupling between the pressure insert 16 and the clamping element 4 has clearance. The clearance is between 0.1 and 0.5 mm, preferably is 0.3 mm, in the axial direction and at most 5 degrees, preferably 2 degrees, in the radial direction. In this case, the axial direction is parallel to the flat side 21 and the radial direction is arranged around the opening 41. By means of this (axial and radial) clearance, an additional possibility arises of compensating for tolerances occurring as a result of manufacture of the individual parts of a tool system. The pressure insert 16 is movably held in an opening 51 in the main part 40 of the clamping element 4 by a fastening means 47, for example a straight pin.

For the projection 5 arranged on the pressure insert 16, the shape of which projection correlates with the depression 7 of a cutting insert 6, that described above applies, mutatis mutandis. The force generated by the clamping means 15 acts over the entire annular surface 31 of the depression 7 of a cutting insert 6 by means of the annular surface 36 of the projection 5 of the pressure insert 16.

FIG. 11 shows another embodiment of the first end 18 of the clamping element 4. Insofar as it relates to the same features as the clamping element 4 according to FIG. 10, the corresponding reference signs and the previous description apply. A clamping element 4 according to FIG. 10 has, at the first end 18 thereof, a modified groove 44'. The lugs 48' are straight and not bent inward, as in the embodiment according to FIG. 10. The guiding surfaces 43' of the insides of the groove 44' are parallel to each other. This results in a groove 44' whose distances A1 and A2 are the same size. The width of the groove 44' is, in the region of the aperture 45 thereof, the same size as in a region at a distance from the aperture. As a result, said groove 44' does not have an undercut. The horizontal movability of a pressure insert 16 which has a spring 46 congruent with the groove 44' is limited exclusively by the securing means 38. The spring 46 engages in the recess 39, which is in the form of a slot. The pressure insert 16 is movably held in the clamping element 4 by a fastening means 17. FIG. 11 shows a simplified form of the first end 18 of a clamping element 4 which meets the requirements of a tool system according to the invention.

The invention describes a tool system 1 comprising a tool holder 2 which has an insert seat 17 for receiving a cutting insert 6 having a depression 7, comprising a clamping element 4 which has an opening 26 for receiving a clamping means 15 and a lug 5, comprising a mechanism (functional dimension $F_x$) which limits the linear movability of the clamping element 4. As a result, an indexable insert 6 is captively and repeatably clamped.

By the guiding portion 25 of the screw 15 frictionally abutting the stop 27 of the wall of the opening 26 when the cutting insert is clamped, the clamping force of the cutting insert 6 in the insert seat in the tool holder 2 is automatically limited.

The invention claimed is:

1. A tool system comprising:
 a cutting insert having a planar top side surface, a planar underside surface opposite to the top side, and a peripheral surface extending between the top side surface and the underside surface,
 the top side surface comprising a single depression, the single depression consisting of:
  a planar or concavely curved bottom surface,
  a vertical central axis of the single depression intersects a center of the bottom surface,
  an annular surface continuously inclined, with respect to the top side surface, between a first rounded transition and a second rounded transition,
  the first rounded transition directly connected to the top side surface and the annular surface, and
  the second rounded transition directly connected to the annular surface and the bottom surface,
 a tool holder comprising:
  an insert seat for receiving the cutting insert,
  a top surface adjacent to the insert seat, and
  a face, remote from the insert seat, inclined with respect to the top surface at an obtuse angle ($\gamma$), and
 a clamping element which has an opening having a wall forming a stop, in which opening a clamping screw having a guiding portion is received, the clamping element comprising a face and a projection, the projection of the clamping element having an annular surface, the annular surface of the clamping element and the annular surface of the cutting insert abutting each other in an interlocking manner when the cutting insert is clamped and, during the process of fastening the clamping element on the tool holder, such that when generating a torque, when turning the clamping screw, the face of the clamping element sliding on the face of the tool holder, as a result of which the clamping element moves relative to the tool holder and pulls and clamps the cutting insert into the insert seat,
 wherein the tool system has a functional dimension Fx between a center of the single depression and the stop of the opening, a magnitude of the functional dimension Fx being such that, at a maximum allowable torque M of the clamping screw, the annular surface of the projection annularly abuts the annular surface of the depression with no distance between the annularly abutting surfaces of the annular surface of the projection and the annular surface of the depression and, when the cutting insert is clamped, the guiding portion of the clamping screw abuts against the stop formed by the wall of the opening.

2. The tool system according to claim 1, wherein the bottom surface is planar and the projection of the clamping element has a planar surface configured to abut the planar bottom of the cutting insert.

3. The tool system according to claim 1, wherein the clamping element comprises a first end and a second end, the projection being provided in a region of the first end and the face being provided in a region of the second end, the first end and the second end being arranged at a distance $E_x$ from each other.

4. The tool system according to claim 3, wherein the opening in the clamping element is arranged at a distance<$E_x/2$ from the second end.

5. The tool system according to claim 3, wherein the opening in the clamping element is arranged at a distance of from 20 to 40% of $E_x/2$ from the second end.

6. The tool system according to claim 3, wherein a first force vector ($F_{nx1}$) which acts from the projection in a direction towards the second end of the clamping element has a greater magnitude than a second force vector ($F_{nx2}$) which acts from the projection in a direction towards the first end of the clamping element.

7. The tool system according to claim 1, wherein the clamping element has a pressure insert on which the projection is formed.

8. The tool system according to claim 7, wherein the pressure insert is formed of ceramic.

9. The tool system according to claim 7, wherein the clamping element further comprises a groove in which the pressure insert is held.

10. The tool system according to claim 1, wherein the clamping element and the projection are formed in one piece.

11. The tool system according to claim 1, wherein the cutting insert further comprises a single depression in the underside such that the cutting insert is reversible.

\* \* \* \* \*